United States Patent
Grebe et al.

(10) Patent No.: US 10,356,849 B2
(45) Date of Patent: Jul. 16, 2019

(54) APPARATUS FOR HEATING POLYMERIC POWDERS BY MEANS OF RADIATION IN POWDER COATING METHODS

(71) Applicant: Evonik Degussa GmbH, Essen (DE)

(72) Inventors: Maik Grebe, Bochum (DE); Wolfgang Diekmann, Waltrop (DE); Andreas Baptista, Duesseldorf (DE)

(73) Assignee: Evonik Degussa GmbH, Essen (DE)

( * ) Notice: Subject to any disclaimer, the term of this patent is extended or adjusted under 35 U.S.C. 154(b) by 139 days.

(21) Appl. No.: 15/705,052

(22) Filed: Sep. 14, 2017

(65) Prior Publication Data
US 2018/0098384 A1 Apr. 5, 2018

(30) Foreign Application Priority Data

Oct. 4, 2016 (DE) .................. 10 2016 219 182
Mar. 3, 2017 (DE) .................. 10 2017 203 523

(51) Int. Cl.
| | |
|---|---|
| *H01B 3/00* | (2006.01) |
| *C09D 5/03* | (2006.01) |
| *B05D 3/02* | (2006.01) |
| *B05D 1/06* | (2006.01) |
| *H05B 3/00* | (2006.01) |
| *C09D 177/02* | (2006.01) |
| *B29C 35/08* | (2006.01) |

(52) U.S. Cl.
CPC ............ *H05B 3/0057* (2013.01); *B05D 1/06* (2013.01); *B05D 3/0263* (2013.01); *C09D 5/03* (2013.01); *C09D 177/02* (2013.01); *H05B 3/009* (2013.01); *B05D 2202/10* (2013.01); *B05D 2401/32* (2013.01); *B05D 2505/00* (2013.01); *B29C 2035/0822* (2013.01)

(58) Field of Classification Search
USPC ............ 522/913; 118/641; 427/595; 264/492
See application file for complete search history.

(56) References Cited

U.S. PATENT DOCUMENTS

| | | | | |
|---|---|---|---|---|
| 4,521,487 A | * | 6/1985 | Mitsuno ...................... | C08J 9/06 427/222 |
| 4,870,118 A | * | 9/1989 | Kinoshita ................ | C08J 3/124 523/207 |
| 6,531,086 B1 | | 3/2003 | Larsson | |
| 6,787,233 B1 | * | 9/2004 | Molteberg ............... | C08K 3/08 428/403 |
| 9,004,896 B2 | | 4/2015 | Senn | |

(Continued)

FOREIGN PATENT DOCUMENTS

| | | |
|---|---|---|
| DE | 103 52 184 A1 | 6/2005 |
| EP | 2 226 180 A1 | 9/2010 |

(Continued)

OTHER PUBLICATIONS

U.S. Appl. No. 15/468,465, filed Mar. 24, 2017, 2017/0274591, Maik Grebe.

*Primary Examiner* — Fred M Teskin
(74) *Attorney, Agent, or Firm* — Grüneberg and Myers PLLC

(57) ABSTRACT

An apparatus for heating powder particles, contains a radiation source (1), a housing (2) and a screen (4). The radiation source (1) has its maximum radiative power in the wavelength range of 0.78-2.5 µm. The screen (4) has an absorbance of at least 0.8 in the wavelength range of 0.78-2.5 µm.

10 Claims, 1 Drawing Sheet

(56) References Cited

U.S. PATENT DOCUMENTS

2012/0220746 A1\* 8/2012 Kurihara ............... B29B 13/022
                                                526/338
2017/0274591 A1   9/2017 Grebe

FOREIGN PATENT DOCUMENTS

| EP | 3 222 410 A1 | 9/2017 |
|----|---|---|
| JP | H07-296946 | 11/1995 |
| JP | H08 285694 A | 11/1996 |
| JP | 2002-143748 | 5/2002 |
| JP | 2004-337712 | 12/2004 |
| JP | 2012-155966 | 8/2012 |

\* cited by examiner

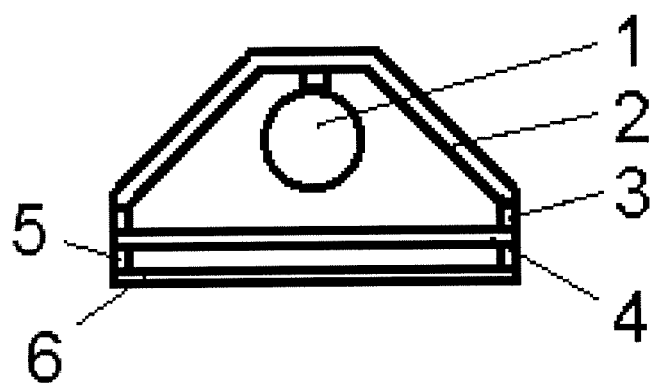

APPARATUS FOR HEATING POLYMERIC POWDERS BY MEANS OF RADIATION IN POWDER COATING METHODS

BACKGROUND OF THE INVENTION

Field of the Invention

The present invention relates to an apparatus for heating polymeric powders by means of radiation in powder coating methods, to a method of heating the powders and to the use of the apparatus.

Description of the Related Art

The powder particles used for powder coating generally consist of dry, grainy particles having a diameter between 1 and 140 µm. In chemical terms, these are usually based on epoxy resins or polyester resins. In addition, hybrid systems containing both epoxy resins and polyester resins as binder are in wide use. Powder particles based on thermoplastic polymers are likewise frequently used.

The state of the art is electrostatic application of the powder particles. In electrostatic powder coating, the first step is to generate a cloud of electrically charged powder. The particles of like charge are transported to the workpiece surface. They are precipitated at the surface, adhere there electrostatically and form the powder coating layer. Charging is possible by corona charging/ionization or by friction. The fusion and/or crosslinking of the powder particles is typically effected by heating in an oven through convection. Heating by convection sometimes takes a relatively long time, and so the charging of the particles declines and adhesion decreases. In this case, the particles can simply fall off before there is any fusion or crosslinking. There is a distinct decrease in the quality of the coating in this case. The powder particles can also be heated by means of electromagnetic radiation. This has the advantage that the fusion/crosslinking can be much quicker. One problem, however, is that many uncoloured polymers have only very poor absorbance of electromagnetic radiation in the visible and near infrared (IR-A) wavelength range (0.78-1.4 µm), or the absorbance is highly dependent on the colouring of the polymer particles. In the case of the uncoloured polymer particles, owing to the poor absorbance, a significant portion of the radiative energy is not utilized. In the case of coloured polymers, the amount of radiation always has to be matched to the particular colour of the polymer. A further drawback of the current prior art is the possible contact of powder particles with hot surfaces and the associated elevated risk of dust explosions.

For the heating of the polymeric powder particles, therefore, an advantageous radiation source is one that releases most of its radiation within the wavelength range of (2.5-10 µm). Radiative heaters such as ceramic radiation sources fulfil this requirement, but are very sluggish with regard to temperature regulation. Therefore, for many applications, there is a requirement for a radiation source that has its radiation maximum in the wavelength range of 2.5 to 10 µm and can be regulated quickly with regard to radiation intensity.

SUMMARY OF THE INVENTION

Accordingly, the problem addressed was that of providing an apparatus which is suitable for the heating of polymeric powder particles but does not have the disadvantages of the prior art. More particularly, the apparatus should have a radiation maximum in the wavelength range of 2.5-10 µm and enable a rapid change in the radiation intensity and hence a rapid change in temperature.

The present invention relates to an apparatus for heating polymer powder particles, comprising:
 a radiation source,
 a housing, and
 a screen,
wherein the radiation source has its maximum radiation power within the wavelength range of 0.78-2.5 µm and the screen has an absorbance of at least 0.8 within the wavelength range of 0.78-2.5 µm.

The present invention further relates to a method of heating polymer powder particles, said method comprising:
 heating the polymer powder particles with an apparatus according to claim 1, wherein the polymer powder particles are exposed to the radiation from the apparatus.

In addition, the present invention relates to a method of coating a powder, said method comprising:
 heating of polymer powder particles.

BRIEF DESCRIPTION OF THE DRAWING

The FIGURE shows the apparatus according to the invention by way of example.

DETAILED DESCRIPTION OF THE INVENTION

Accordingly, an apparatus of the type specified at the outset has been found, comprising a radiation source, a housing and a screen. The radiation source of the apparatus has its maximum radiative power in the wavelength range of 0.78-2.5 µm. The term "in the wavelength range" or "in the overall wavelength range" in respect of the radiation source is understood such that the radiation source has a maximum radiative power at at least one wavelength in the wavelength range specified. The screen has an absorbance of at least 0.8 in the wavelength range of 0.78-2.5 µm. The term "in the wavelength range" or "in the overall wavelength range" in respect of the screen is understood such that the screen has at least the absorbance specified at all wavelengths in the wavelength range specified. The screen is preferably aligned at right angles to the radiation source within the housing. With regard to the polymer powder particles to be heated, the screen is preferably aligned in parallel.

It has been found that, surprisingly, in the form of the apparatus according to the invention, an apparatus can be provided as a radiative heater which can generate radiation necessary for the efficient heating of polymeric powder particles and at the same time can be regulated quickly in terms of intensity and temperature. The particles are not heated directly by the radiation source, but by the screen. The screen absorbs the radiative energy from the radiation source and releases the energy in a shifted wavelength range. The radiation maximum of the apparatus according to the invention is accordingly preferably at a wavelength of more than 2.5 µm and below 4.8 µm, preferably between 3.1 µm and 4.2 m.

Suitable radiation sources are IR-A radiation sources (wavelengths of 0.78 to 1.4 µm) such as halogen lamps or NIR lasers (NIR=near infrared).

The screen, over the entire wavelength range of 0.78-2.5 µm, has an absorbance of at least 0.8, preferably at least 0.9 and more preferably at least 0.95. The thickness of the screen is preferably not more than 1 mm. The thickness is preferably not more than 0.5 mm, more preferably not more than 0.3 mm and most preferably not more than 0.1 mm.

The screen should preferably have a low heat capacity. As a result, the screen reacts relatively quickly to changes in the radiation intensity of the radiation source. This enables a rapid change in temperature of the apparatus.

Examples of suitable materials for the screen are selected from oxidized metals such as steel sheets, aluminium, copper or silver sheets, graphite, silicon, surface-treated and/or coloured ceramics, mineral fibres and coloured glasses, preference being given to eloxed and coloured, especially black-coloured, aluminium. Combinations of the materials mentioned are also possible.

The radiation source is surrounded by a housing, the surfaces of which that face the radiation source preferably have a low absorbance of less than 0.4 in the wavelength range of 0.78-2.5 µm, more preferably less than 0.3. The housing has at least one opening in the direction of the screen. Examples of suitable materials for the housing are metals, preferably having a polished surface (Rz according to DIN EN ISO 4287 of max. 2 µm), metallized ceramics and ceramics having low absorbance (less than 0.4 in the wavelength range of 0.78-2.5 µm). The term "in the wavelength range" or "in the overall wavelength range" in respect of the housing is understood such that the housing has a lower absorbance than that specified at all wavelengths in the wavelength range specified.

In a preferred embodiment, the apparatus according to the invention additionally comprises a guard plate. In this case, the screen is arranged between the radiation source and the guard plate. The guard plate prevents direct contact of the heated screen with the polymeric powder particles. The guard plate may be transparent. The transmittance of the guard plate in the wavelength range of 2.5-4.8 µm is preferably at least 0.9. The guard plate may be selected, for example, from chalcogenide glass and sapphire glass. The term "in the wavelength range" or "in the overall wavelength range" in respect of the guard plate is understood such that the guard plate has at least the transmittance specified at all wavelengths in the wavelength range specified.

With the combination of multiple apparatuses according to the invention, it is possible also to heat greater areas. If these apparatuses are regulated differently, it is possible to match the temperature distribution on the surface to be heated to the technical requirements. In a further alternative embodiment, multiple radiation sources are combined with a screen in order to heat greater areas.

The housing and screen are preferably thermally decoupled. If a guard plate is included, it is preferable that the housing, screen and guard plate are thermally decoupled from one another.

The absorbance and the transmittance are determined by means of a Cary 5000 UV-vis/NIR spectrophotometer from Varian to DIN EN ISO 13468-2:2006-07. The measurement takes place under standard conditions (23° C./50%).

Examples of suitable polymers which can be processed by means of the apparatus according to the invention are polyamides such as nylon-6, nylon-11 or nylon-12, copolyamides such as nylon-4,6, nylon-6,6, nylon-6,13, nylon-10,6, nylon-10,10, nylon-10,12, nylon-12,12, nylon-10,13, nylon-12/10,12, polyolefins such as polyethylene and polypropylene, polyesters, and polyaryl ether ketones (PEAKs) such as polyether ether ketone.

The FIGURE shows the apparatus according to the invention by way of example. The apparatus comprises a radiation source (1) having a maximum radiative power in the wavelength range of 0.78-2.5 µm. The radiation source is surrounded by a housing (2), the inner surface of which (surface facing the radiation source) has a low absorbance. On one side of the housing (2) is an opening in which there is a screen (4) having a high absorbance. The screen (4) and housing (2) are preferably thermally decoupled by means of an insulator (3). Preferably, the apparatus according to the invention has a transparent guard plate (6) in order to avoid direct contact between the screen and powder particles. The plate (6) and screen (4) are preferably thermally decoupled by means of an insulator (5).

The heating of the powder particles can be conducted until fusion.

The present invention likewise provides a method of heating polymeric powder particles, wherein the apparatus according to the invention is used. This involves exposing polymer powders to the radiation from the apparatus. The powder particles are preferably heated at a heating rate of at least 2 K/s, preferably at least 10 K/s, and more preferably at least 20 K/s. The change in temperature is measured with a pyrometer (optris CTfastLT) from Optris.

The invention further provides for the use of the apparatus according to the invention for heating of polymer powder particles, preferably in powder coating methods.

Having generally described this invention, a further understanding can be obtained by reference to certain specific examples which are provided herein for purposes of illustration only, and are not intended to be limiting unless otherwise specified.

EXAMPLES

The apparatuses described in the examples were used to heat powders. For the experiments, an uncoloured nylon-12 powder having the characteristics listed in Table 1 was used. The experiments were conducted under standard climatic conditions (23° C./50%). The radiation sources had a power rating of 500 W. In all the examples, a flat powder layer of thickness 0.5 mm was applied to a plate of polished steel. The radiative heaters were positioned at a distance of 20 mm above the powder surface. The powder, the metal plate and the radiative heaters were conditioned under the standard climatic conditions for 2 h before the measurement was started. In the examples, the radiative heaters were switched on and the time taken for the powder to start to melt was measured.

Example 1: Halogen Radiation Source without Screen (Noninventive)

A halogen radiation source comprising a halogen lamp as radiation source, a housing and a guard plate had its maximum radiative power in the wavelength range of 0.78-2.5 µm.

Example 2: Ceramic Radiation Source (Noninventive)

A ceramic radiation source had its maximum radiative power in the IR-C wavelength range (3-1000 µm).

Example 3: Halogen Radiation Source with Screen (Inventive)

The halogen radiation source from Example 1 had a screen made from oxidized steel sheet with a thickness of 0.5 mm and with an absorbance of more than 0.88 in the wavelength range of 0.78-2.5 µm.

Example 4: Halogen Radiation Source with Screen (Inventive)

The halogen radiation source from Example 1 had a screen made from eloxed and black-coloured aluminium sheet with a thickness of 0.3 mm and with an absorbance of more than 0.95 in the wavelength range of 0.78-2.5 µm.

TABLE 1

Powder characteristics of the nylon-12 used

| | Value | Unit | Test type/test instrument/test parameter |
|---|---|---|---|
| Bulk density | 0.450 | g/cm$^3$ | DIN EN ISO 60 |
| Particle size d50 | 57 | µm | Malvern Mastersizer 2000, dry measurement, metered addition of 20-40 g of powder using Scirocco dry dispersion instrument. Vibratory trough feed rate 70%, dispersing air pressure 3 bar. Sample residence time 5 seconds (5000 individual measurements), refractive index and blue light value fixed at 1.52. Evaluation by Mie theory. |
| Particle size d10 | 36 | µm | Malvern Mastersizer 2000, see particle size d50 for parameters |
| Particle size d90 | 82 | µm | Malvern Mastersizer 2000, see particle size d50 for parameters |
| <10.48 µm | 1.4 | % | Malvern Mastersizer 2000, see particle size d50 for parameters |
| Flowability | 28 | s | DIN EN ISO 6186, Method A, diameter of nozzle outlet 15 mm |
| Solution viscosity | 1.58 | — | ISO 307, Schort AVS Pro, solvent: acidified m-cresol, volumetric method, double determination, dissolution temperature 100° C., dissolution time 2 h, polymer concentration 5 g/l Measurement temperature 25° C. |
| BET (spec. surface area) | 6.7 | m$^2$/g | ISO 9277, Micromeritics TriStar 3000, nitrogen gas adsorption, discontinuous volumetric method, 7 data points at relative pressures P/P0 from about 0.05 to about 0.20, dead volume calibration using He (99.996%), sample preparation 1 h at 23° C. + 16 h at 80° C. in vacuo, spec. surface area based on the devolatilized sample, evaluation by means of multipoint determination |
| Melting point, 1st heating | 187 | ° C. | DIN 53765 Perkin Elmer DSC 7 heating/cooling rate 20 K/min |
| Recrystallization temperature | 142 | ° C. | DIN 53765 Perkin Elmer DSC 7 heating/cooling rate 20 K/min |
| Material conditioning | | | Material stored for 24 h at 23° C. and 50% humidity prior to processing/analysis |

TABLE 2

Experimental results

| | Example 1 | Example 2 | Example 3 | Example 4 |
|---|---|---|---|---|
| Time required for the powder to start to melt in s | 491 | 151 | 84 | 73 |

The apparatuses according to the invention from Examples 3 and 4 required a much shorter time to melt the powder. In applications such as electrostatic coating or mini-coating, for example, or in the powder-based methods specified in ISO/ASTM 52900, it is possible to achieve distinct acceleration of the process and hence of productivity. Moreover, a smaller amount of energy is also required to melt the powder. The apparatus according to the invention thus enables thicker powder layers, or heating or melting of multiple layers.

German patent application 102016219182.9 filed Oct. 4, 2016 and German patent application 102017203523.4 filed Mar. 3, 2017, are incorporated herein by reference.

Numerous modifications and variations on the present invention are possible in light of the above teachings. It is therefore to be understood that within the scope of the appended claims, the invention may be practiced otherwise than as specifically described herein.

The invention claimed is:

1. An apparatus for heating polymer powder particles, comprising:
 a radiation source,
 a housing, and
 a screen,
 wherein the radiation source has its maximum radiation power within the wavelength range of 0.78-2.5 µm and the screen has an absorbance of at least 0.8 within the wavelength range of 0.78-2.5 µm.

2. The apparatus according to claim 1, wherein the surfaces of the housing facing the radiation source have an absorbance of less than 0.4 within the wavelength range of 0.78-2.5 µm.

3. The apparatus according to claim 1, wherein the screen is arranged between the radiation source and a guard plate.

4. The apparatus according to claim 3, wherein the guard plate has a transmittance of at least 0.9 within the wavelength range of 2.5 µm-10 µm.

5. The apparatus according to claim 3, wherein housing, screen and guard plate are thermally decoupled.

6. The apparatus according to claim 1, wherein the screen consists of anodized and coloured aluminum.

7. The apparatus according to claim 1, wherein the screen has a thickness of not more than 1 mm.

8. A method of heating polymer powder particles, said method comprising:
 heating the polymer powder particles with an apparatus according to claim 1, wherein the polymer powder particles are exposed to the radiation from the apparatus.

9. The method according to claim 8, wherein the polymer powder particles are heated at a heating rate of at least 2 K/s.

10. A method of coating a powder, said method comprising: heating of polymer powder particles with an apparatus according to claim 1.

* * * * *